United States Patent
Terasaki et al.

(10) Patent No.: US 8,874,723 B2
(45) Date of Patent: Oct. 28, 2014

(54) SOURCE DETECTION DEVICE FOR DETECTING A SOURCE OF SENDING A VIRUS AND/OR A DNS ATTACK LINKED TO AN APPLICATION, METHOD THEREOF, AND PROGRAM THEREOF

(75) Inventors: Hiroshi Terasaki, Tokyo (JP); Masayoshi Tamai, Tokyo (JP); Sonomi Kawatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 954 days.

(21) Appl. No.: 12/521,026

(22) PCT Filed: Dec. 28, 2007

(86) PCT No.: PCT/JP2007/075254
§ 371 (c)(1),
(2), (4) Date: Jul. 6, 2009

(87) PCT Pub. No.: WO2008/084729
PCT Pub. Date: Jul. 17, 2008

(65) Prior Publication Data
US 2009/0319659 A1 Dec. 24, 2009

(30) Foreign Application Priority Data

Dec. 28, 2006 (JP) .................................. 2006-354763
Dec. 20, 2007 (JP) .................................. 2007-328685

(51) Int. Cl.
*G06F 15/173* (2006.01)
*G06F 15/16* (2006.01)
*H04L 29/06* (2006.01)

(52) U.S. Cl.
CPC ....... *H04L 63/1416* (2013.01); *H04L 2463/146* (2013.01)
USPC ............................ 709/224; 709/203; 709/223

(58) Field of Classification Search
USPC ...................... 709/224; 726/22–25
See application file for complete search history.

(56) References Cited

U.S. PATENT DOCUMENTS 6,907,525 B2 * 6/2005 Pazi et al. ..................... 713/170
7,062,553 B2 * 6/2006 Liang ............................ 709/224

(Continued)

FOREIGN PATENT DOCUMENTS

| JP | 1998200529 A | 7/1998 |
| JP | 2003241989 A | 8/2003 |

(Continued)

OTHER PUBLICATIONS

International Search Report for PCT/JP2007/075254 mailed Apr. 22, 2008.

*Primary Examiner* — Minh-Chau Nguyen
(74) *Attorney, Agent, or Firm* — Sughrue Mion, PLLC

(57) ABSTRACT

An original attacker which has set a computer as a springboard is detected by detecting a source of a virus or a DNS attack linked to an application, which attacks other computers. A source detection device for detecting a source of a virus or a DNS attack captures packets from a network under setting conditions, and extracts required information. The source detection device stores data such as information concerning behaviors and/or features of viruses and/or DNS attacks, and/or logs of respective servers, which are required for an application traceback. Linkage of a virus or a DNS attack is determined from an application traceback processing result stored in a database and from various data, and new conditions are set accordingly. Under the new conditions, source detection is carried out for a virus or a DNS attack. Data is updated and accumulated accordingly, and linkage and a relationship between a behavior of an attack and a virus or a DNS attack is determined, thereby to detect a source of the attack.

22 Claims, 6 Drawing Sheets

(56) References Cited

U.S. PATENT DOCUMENTS

| | | | |
|---|---|---|---|
| 7,372,809 B2 * | 5/2008 | Chen et al. | 370/229 |
| 7,418,732 B2 * | 8/2008 | Campbell et al. | 726/23 |
| 7,752,324 B2 * | 7/2010 | Hamadeh et al. | 709/230 |
| 7,757,285 B2 * | 7/2010 | Kubota | 726/23 |
| 7,814,546 B1 * | 10/2010 | Strayer et al. | 726/23 |
| 7,936,682 B2 * | 5/2011 | Singh et al. | 370/241 |
| 2004/0093521 A1 * | 5/2004 | Hamadeh et al. | 713/201 |
| 2005/0021740 A1 * | 1/2005 | Bar et al. | 709/224 |
| 2005/0091538 A1 * | 4/2005 | Hoche et al. | 713/201 |
| 2005/0132219 A1 * | 6/2005 | Robert | 713/201 |
| 2006/0075093 A1 * | 4/2006 | Frattura et al. | 709/224 |
| 2006/0184690 A1 * | 8/2006 | Milliken | 709/238 |
| 2007/0256127 A1 * | 11/2007 | Kraemer et al. | 726/23 |
| 2008/0028073 A1 * | 1/2008 | Trabe et al. | 709/225 |

FOREIGN PATENT DOCUMENTS

| | | |
|---|---|---|
| JP | 2003258910 A | 9/2003 |
| JP | 2004086241 A | 3/2004 |
| JP | 2005025378 A | 1/2005 |
| JP | 2005217692 A | 8/2005 |
| JP | 2005275683 A | 10/2005 |
| JP | 2005341217 A | 12/2005 |
| JP | 2006018527 A | 1/2006 |
| JP | 2006033472 A | 2/2006 |
| JP | 2006135885 A | 5/2006 |
| JP | 2006191433 A | 7/2006 |
| JP | 2006243878 A | 9/2006 |
| JP | 2006350561 A | 12/2006 |
| JP | 2007249348 A | 9/2007 |
| JP | 2007288246 A | 11/2007 |

* cited by examiner

FIG.3

EXAMPLE OF FORMATTING SMTP INTO RFC3164 SYSLOG FORMAT

```
<189>Dec2102:25:09 host1 aptb-probe:year=2005,seq=000000023,
id=00000341,part=1/1,src=192.168 200,31,30, helo=192.168. 200,31,
from=<foo@abcd.com>,to=<bar@xyz.net>,file name="readme.doc
file size=2331,file en codings=base64,file decode=yes,
file hash=md5:93 adfa329309fe38qqe3wfq42t42ae2p,
Message id=<CA9EEW7999AI2736432q8@mail.abcd.com>,
X-Sonota-Header=X-Mailer:MTA_MAILER<CRLF>
```

ITEMS OF SYSLOG FORMAT

| | |
|---|---|
| (PRI SECTION) | |
| PRI SECTION ACCORDING TO RFC3164 | (EXAMPLE) <189> |
| (HEADER SECTION) | |
| DATE/TIME | (EXAMPLE) Dec2102:30:21 |
| PROBE HOST NAME | (EXAMPLE) host1 |
| (MSG SECTION) | |
| TAG | (EXAMPLE) aptb-probe: |
| YEAR | (EXAMPLE) year=2005 |
| PROTOCOL NAME | (EXAMPLE) protocol=" smtp" |
| LOG ID | (EXAMPLE) id=00000341 |
| SEQUENTIAL NO. | (EXAMPLE) seq=00000032 |
| SESSION NO. | (EXAMPLE) sno="000000000000 1001" |
| PART NO. | (EXAMPLE) part=1/3 |
| HELO ADDRESS | (EXAMPLE) cmd="helo <mail.abcd.com>" |
| SRCIP,SRCPORT | (EXAMPLE) src=192.168.200,31:10:23 |
| SOURCE ADDRESS | (EXAMPLE) cmd=" mail from=<foo@abcd.com>" |
| DESTINATION ADDRESS | (EXAMPLE) cmd=" rcpt to <bar@xyz.net>" |
| OTHER COMMANDS | (EXAMPLE) cmd="DATA" AND cmd="QUIT" |
| VARIOUS RESPONSES | (EXAMPLE) reply="220 host1 ESMTP..." |
| MESSAGE ID | (EXAMPLE) Message id=<AA9390e230@abcd.com> |
| BODY DATA | (EXAMPLE) data="OM8R4KGxGuEAAAAAAAAAAAAAAAA" |
| ENCODING WORD SIZE | (EXAMPLE) ewsize=200 |
| OTHER HEADER INFORMATION | (EXAMPLE) X-Sonota-Header=X-Mailer:MTA_MAILER |

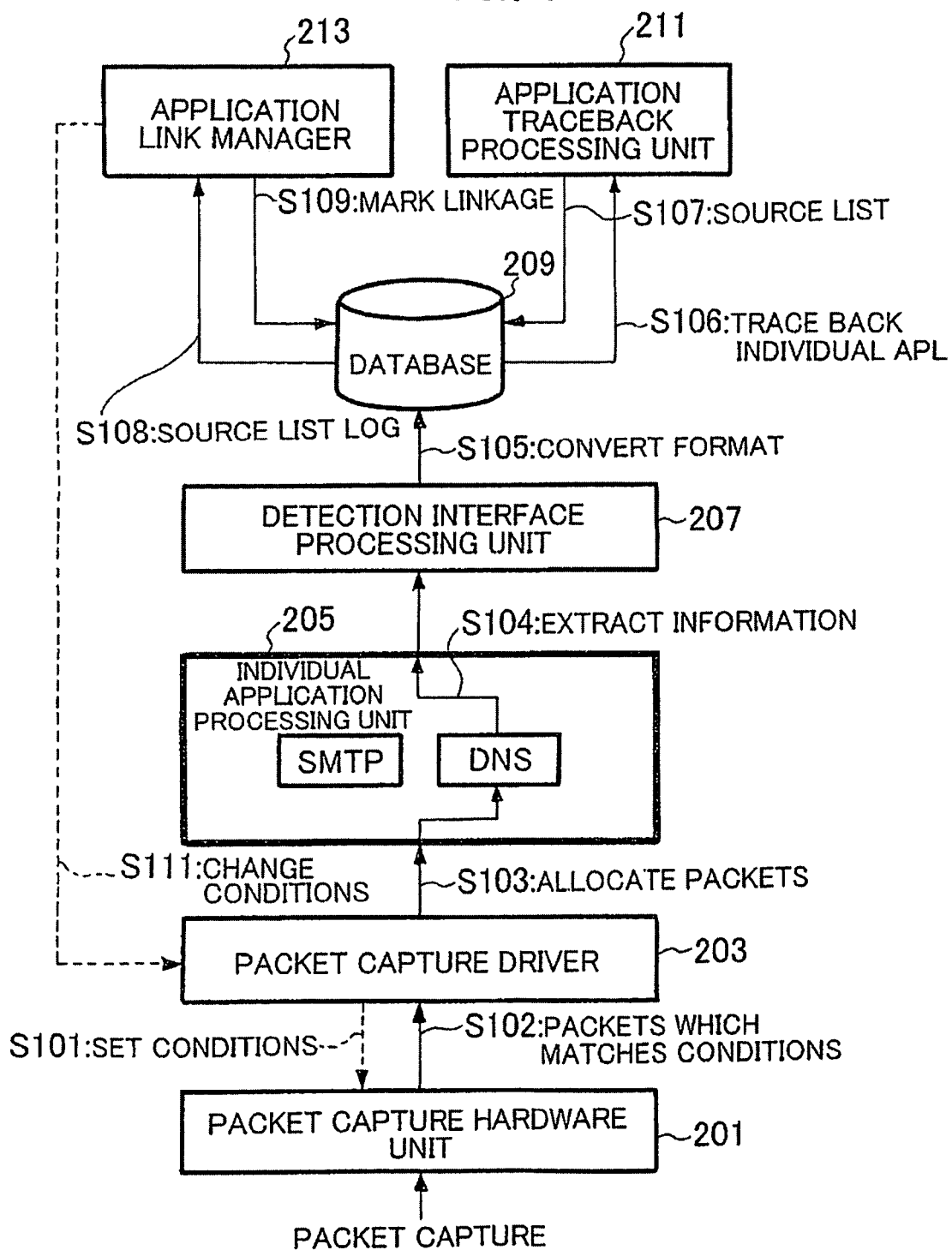

FIG.6

EXAMPLE OF FORMATTING DNS INTO RFC3164 SYSLOG FORMAT

```
<181>Jan 12 10:30:36 host1 aptb-probe:year="2006",protocol="dns",seq="000000000001"
Id="00000000000001",sno="00000000000001",part="1/1",src="192.168.200.31,1023",
dst="192.168.200.32:53",dnsId="4",dnsQr="0",dnsRd="1",dnsRa="0",
dnsQnamehash="888ef48Qa39acc335b63409e9c5dcdbbb47c1 b37",dnsQtype="2",dnsQclass="1"<CRLF>
```

ITEMS OF SYSLOG FORMAT

| | (EXAMPLE)<181> |
|---|---|
| (PRI SECTION) | |
| PRI SECTION ACCORDING TO RFC3164 | |
| (HEADER SECTION) | |
| DATE/TIME | (EXAMPLE) Dec21 02:30:21 |
| PROBE HOST NAME | (EXAMPLE) host1 |
| | |
| (MSG SECTION) | |
| TAG | (EXAMPLE) aptb-probe: |
| YEAR | (EXAMPLE) year=2007 |
| PROTOCOL NAME | (EXAMPLE) protocol="dns" |
| LOG ID | (EXAMPLE) id=00000341 |
| SEQUENTIAL NO. | (EXAMPLE) seq=00000032 |
| SESSION NO. | (EXAMPLE) sno="00000000000001001" |
| PART NO. | (EXAMPLE) part=1/1 |
| SRCIP,SRCPORT | (EXAMPLE) src="192.168.200.31:10:23" |
| IRCIP,IRCPORT | (EXAMPLE) dst="192.168.200.32:53" |
| DES ID | (EXAMPLE) dnsId="1234" |
| DES QR | (EXAMPLE) dnsQr="1" |
| DES RD | (EXAMPLE) dnsRd="1" |
| DNS QNAME HASH | (EXAMPLE) dnsQnameHash="1479abb96a0fe56cdd35906d11ff2e07e31725ed" |
| DNS NAME HASH | (EXAMPLE) dnsNameHasu="6479abb96a0fe56cdd35906dff2e07e31725cd" |

SOURCE DETECTION DEVICE FOR DETECTING A SOURCE OF SENDING A VIRUS AND/OR A DNS ATTACK LINKED TO AN APPLICATION, METHOD THEREOF, AND PROGRAM THEREOF

The present application is the National Phase of PCT/JP2007/075254, filed Dec. 28, 2007, which is based on and claims priority from Japanese Patent Applications No. 2006-354763 (filed Dec. 28, 2006) and No. 2007-328685 (filed Dec. 20, 2007) which are hereby incorporated by reference.

TECHNICAL FIELD

The present invention relates to a source detection device for detecting a source of sending a virus and/or a DNS attack linked to an application, in order to search for a source of a cyberattack on a network.

BACKGROUND ART

In recent years, attacks to the Internet vary everyday, and patterns of the attacks have become more and more complex. Reported cases are not only well-known attacks of sending packets stating a false send source but also attacks using a springboard, e.g., by using as a springboard a botnet of computers infected by a virus. Attacks also have so variously diversified as to make free use of plural protocols.

DNS reflector attacks using DNS (Domain Name System), which bases the Internet, have been becoming apparent as a further problem. The DNS reflector attacks observes an attack method of sending a DNS query to a computer as an attack target by spoofing a false IP (Internet Protocol) address, thereby to concentrate responses onto the attacked computer. According to this attack method, a DNS reply is amplified multiply, by using plural cache servers on the Internet. As a result, a huge volume of packets are suddenly sent to an attacked computer. Because of the huge volume of packets sent, bands are all occupied thereby hindering services.

There is also a tendency of increase in danger of linkage to plural applications, e.g., leading to malicious web servers such as fishing by information transmitted based on emails.

Known traceback techniques based on IPpackets are to detect computers which are caused to directly make attacks, and therefore can be used to detect only springboards when attacks are made using computers as springboards.

What file has infected a computer as a springboard through what route is investigated by detailed inspections on the logs on each server or the like. However, determinations on such detailed inspections depend on human judges. A traceback dynamically depending on applications is hard to achieve.

Countermeasures against DNS attacks in actual operation are reduction of vulnerability by applying a security patch so as to prevent settings from being changed, reduction of open relay conditions by restricting service ranges for DNS cache, etc.

In this respect, Patent Literatures 1 to 6 cited below describe methods as techniques relevant to tracebacks of a source as a sender or addition of traceable information to packets.

The invention described in Patent Literature 1 relates to a method of accumulating information required for tracebacks into client computers.

The invention described in Patent Literature 2 relates to a method of adding and/or deleting information required for tracebacks to and/or from packets by a router.

The invention described in Patent Literature 3 relates to a method as follows. Each TCP PUSH packet is referred to. Among destination address port numbers and data, whether at least data mutually corresponds between the TCP PUSH packets is checked. If a TCP PUSH packet having at least data corresponds to that of another TCP PUSH packet is transmitted/received within a predetermined time period, transmission/reception of the TCP PUSH packet is determined to be an unauthorized access.

The invention described in Patent Literature 4 relates to a method of specifying an attacking packet by using, as information required for tracebacks, header information of constantly collected packets, header information of an attacking packet, and/or inter-router connection information.

The invention described in Patent Literature 5 relates to a method of specifying a springboard attack by detecting an attacking packet in a device which collects traffic, and by taking, correlation of a packet which is correlated with the attacking packet as information required for tracebacks.

The invention described in Patent Literature 6 relates to a method of determining an attack when transmission of information to one identical address reaches a given threshold.

CITATION LIST

Patent Literature

{PTL 1} JP-A-2004-086241
{PTL 2} JP-A-2005-275683
{PTL 3} JP-A-2006-033472
{PTL 4} JP-A-2006-135885
{PTL 5} JP-A-2006-191433
{PTL 6} JP-A-2006-350561

SUMMARY OF INVENTION

Technical Problem

The invention described in Patent Literature 1 needs to accumulate information required for tracebacks into client computers. Specialized software hence needs to be introduced.

Each client computer detects a source of sending a virus on the basis of a fact that a virus has entered. However, no mechanism is provided to cope with linkage to applications which make attacks.

In the method described in Patent Literature 2, an attacker and an attacked target can be specified for an attack using IP. However, there is also a problem that no mechanism is provided to cope with linkage to applications in case where a computer as a springboard exists.

In the method described in Patent Literature 3, mutual correspondence of at least transmitted/received data is needed. Therefore, there is a problem that no mechanism is provided to cope with linkage to applications for which complete correspondence of transmitted/received data such as a virus or DNS is not attained in case where a computer as a springboard exists.

In the method described in Patent Literature 4, an attacker and an attacked target can be specified for an attack using IP. However, there is a problem that no mechanism is provided to cope with linkage to applications in case where a computer as a springboard exists.

Also in the method described in Patent Literature 5, an attacker and an attacked target can be specified about an attack using IP. There is also a problem that no mechanism is provided to cope with linkage to applications in case where a computer as a springboard exists.

Also in the method described in Patent Literature 6, an attacker and an attacked target can be specified about an attack using IP. There is also a problem that no mechanism is provided to cope with linkage to applications in case where a computer exists as a springboard.

In order to determine linkage, a high-rate data collection device capable of flexibly changing various conditions, and control software for accumulating and updating a large volume of data which enables a determination about linkage can be put into cooperation with each other without depending on client computer environments.

Detection of a source according to the Patent Literatures 1 to 6 cited above is focused on IP packets and is achieved even from a spoofed source address or port number, in a manner of tracing back a source address by recording history of packet transfer through a router or a switch or in a manner of adding traceable information to packets. In case of a DoS (Denial of Service) attack, the methods of those publications are capable of detecting only computers as senders which have directly attacked. Consequently, a computer as a springboard which has sent an attack can be detected while an actual attacker which has originally set the springboard can hardly be specified.

In case of devices which are focused on an application protocol and actualize tracebacks of applications, satisfactory consideration is not taken into operations which involve linkage to applications. Therefore, detection of a source is limited to the protocol used by one single application. When spreading infection of a virus by emails and a server attack aiming for DoS are caused by one identical virus, the infection and the server attack are respectively dealt with as separate applications. Relationships and linkage between operations of the applications caused by viruses are determined by human judges. Actual sources which send attacks cannot yet be specified.

Also for DoS attacks to servers by using DNS servers, relationships and linkage between DNS queries and DNS replies are determined by human judges. Actual sources which send attacks cannot yet be specified.

Existing systems as described above do not have an anonymity function which actualizes privacy protection for users, and can therefore not actualize privacy protection in communications.

The present invention hence has been made to solve the problems described above and to provide a source detection device for detecting a source of sending an application-linked virus and an application-linked DNS attack, a method thereof, a computer program product embodied on a non-transitory computer-readable medium, and a program thereof, which are capable of detecting an attacker which has originally set a springboard which directly attacks other computers.

Solution to Problem

According to an aspect of the present invention, as a first device, there is provided a source detection device for detecting a source of a virus and/or a DNS attack linked to an application, the source detection device being connected to a network and collecting data transferred through the network, the device characterized by including: a packet capture means for capturing packets transferred through the network; an application determination means for reconstructing data from the captured packets and determining whether a supported protocol is used by the data or not; an individual application processing means for performing a processing based on a corresponding application protocol for extracting information required for an application traceback, if a supported protocol is used by the data; a format standardization means for converting a processing result based on the corresponding application protocol, into a common format for the application traceback; a log recording means for storing virus information on the network and a communication record; a means for determining whether or not linkage exists between data from the format standardization means and data from the log recording means; a means for storing a temporarily-assumed source for which existence of the linkage is recognized to be possible; a means for issuing a traceback execution request from a server; and an application traceback detection means for actualizing an application traceback function, based on a correlation between data of the temporarily-assumed source and the corresponding application protocol.

Further, as a second device, there is provided a source detection device for detecting a source of a virus and/or a DNS attack linked to an application, the source detection device being connected to a network and collecting data transferred through the network, the device characterized by including: a packet capture means for capturing packets transferred through the network; an application determination means for reconstructing data from the captured packets and determining whether a supported protocol is used by the data or not; an individual application processing means for performing a processing based on a corresponding application protocol for extracting information required for an application traceback, if a supported protocol is used by the data; a format standardization means for converting a processing result based on the corresponding application protocol, into a common format for the application traceback; a log recording means for storing DNS attack information on the network and a communication record; a means for determining whether or not linkage exists between data from the format standardization means and data from the log recording means; a means for storing a temporarily-assumed source for which existence of the linkage is recognized to be possible; a means for issuing a traceback execution request from a server; and an application traceback detection means for actualizing an application traceback function, based on a correlation between data of the temporarily-assumed source and the corresponding application protocol.

Still further, as a first method, there is provided a source detection method for detecting a source of a virus and/or a DNS attack linked to an application, the source detection method being for use in connection with a network and collecting data transferred through the network, the method characterized by including: a packet capture step of capturing packets transferred through the network; an application determination step of reconstructing data from the captured packets and determining whether a supported protocol is used by the data or not; an individual application processing step of performing a processing based on a corresponding application protocol for extracting information required for an application traceback, if a supported protocol is used by the data; a format standardization step of converting a processing result based on the corresponding application protocol, into a common format for the application traceback; a log recording step of storing virus information on the network and a communication record; a step of determining whether or not linkage exists between data from the format standardization step and data from the log recording step; a step of storing a temporarily-assumed source for which existence of the linkage is recognized to be possible; a step of issuing a traceback execution request from a server; and an application traceback detection step of actualizing an application traceback function, based on a correlation between data of the temporarily-assumed source and the corresponding application protocol.

Still further, as a second method, there is provided another source detection method for detecting a source of a virus and/or a DNS attack linked to an application, the source detection method being for use in connection with a network and collecting data transferred through the network, the method characterized by including: a packet capture step of capturing packets transferred through the network; an application determination step of reconstructing data from the captured packets and determining whether a supported protocol is applied to the data or not; an individual application processing step of performing a processing based on a corresponding application protocol for extracting information required for an application traceback, if a supported protocol is applied to the data; a format standardization step of converting a processing result based on the corresponding application protocol, into a common format for the application traceback; a log recording step of storing DNS attack information on the network and a communication record; a step of determining whether or not linkage exists between data from the format standardization step and data from the log recording step; a step of storing a temporarily-assumed source for which existence of the linkage is recognized to be possible; a step of issuing a traceback execution request from a server; and an application traceback detection step of actualizing an application traceback function, based on a correlation between data of the temporarily-assumed source and the corresponding application protocol.

Still further, as a first program, there is provided a source detection program for detecting a source of a virus and/or a DNS attack linked to an application, the source detection program being for use in connection with a network and collecting data transferred through the network, the program characterized by causing a computer to execute: a packet capture function that captures packets transferred through the network; an application determination function that reconstructs data from the captured packets and determines whether a supported protocol is used by the data or not; an individual application processing function that performs a processing based on a corresponding application protocol for extracting information required for an application traceback, if a supported protocol is used by the data; a format standardization function that converts a processing result based on the corresponding application protocol, into a common format for the application traceback; a log recording function that stores virus information on the network and a communication record; a function that determines whether or not linkage exists between data from the format standardization function and data from the log recording function; a function that stores a temporarily-assumed source for which existence of the linkage is recognized to be possible; a function that issues a traceback execution request from a server; and an application traceback detection function that actualizes an application traceback function, based on a correlation between data of the temporarily-assumed source and the corresponding application protocol.

Still further, as a second program, there is provided another source detection program for detecting a source of a virus and/or a DNS attack linked to an application, the source detection program being for use in connection with a network and collecting data transferred through the network, the program characterized by causing a computer to execute: a packet capture function that captures packets transferred through the network; an application determination function that reconstructs data from the captured packets and determines whether a supported protocol is applied to the data or not; an individual application processing function that performs a processing based on a corresponding application protocol for extracting information required for an application traceback, if a supported protocol is applied to the data; a format standardization function that converts a processing result based on the corresponding application protocol, into a common format for the application traceback; a log recording function that stores DNS attack information on the network and a communication record; a function that determines whether or not linkage exists between data from the format standardization function and data from the log recording function; a function that stores a temporarily-assumed source for which existence of the linkage is recognized to be possible; a function that issues a traceback execution request from a server; and an application traceback detection function that actualizes an application traceback function, based on a correlation between data of the temporarily-assumed source and the corresponding application protocol.

Advantageous Effects of Invention

According to the present invention, linkage to applications can be recognized by collecting required information and by attaining effective information and data concerning relationships while dynamically changing conditions. As a result, an original attacker which has set a computer as a springboard is detected by detecting a source of sending a virus or a DNS attack linked to an application, which attacks other computers.

BRIEF DESCRIPTION OF DRAWINGS

FIG. 3 An example of information which has been extracted from packets and converted into a common format.

FIG. 4 A diagram showing an example configuration of another embodiment of the present invention.

FIG. 6 An example of information which has been extracted from packets and converted into a common format.

REFERENCE SIGNS LIST

Figure 1:
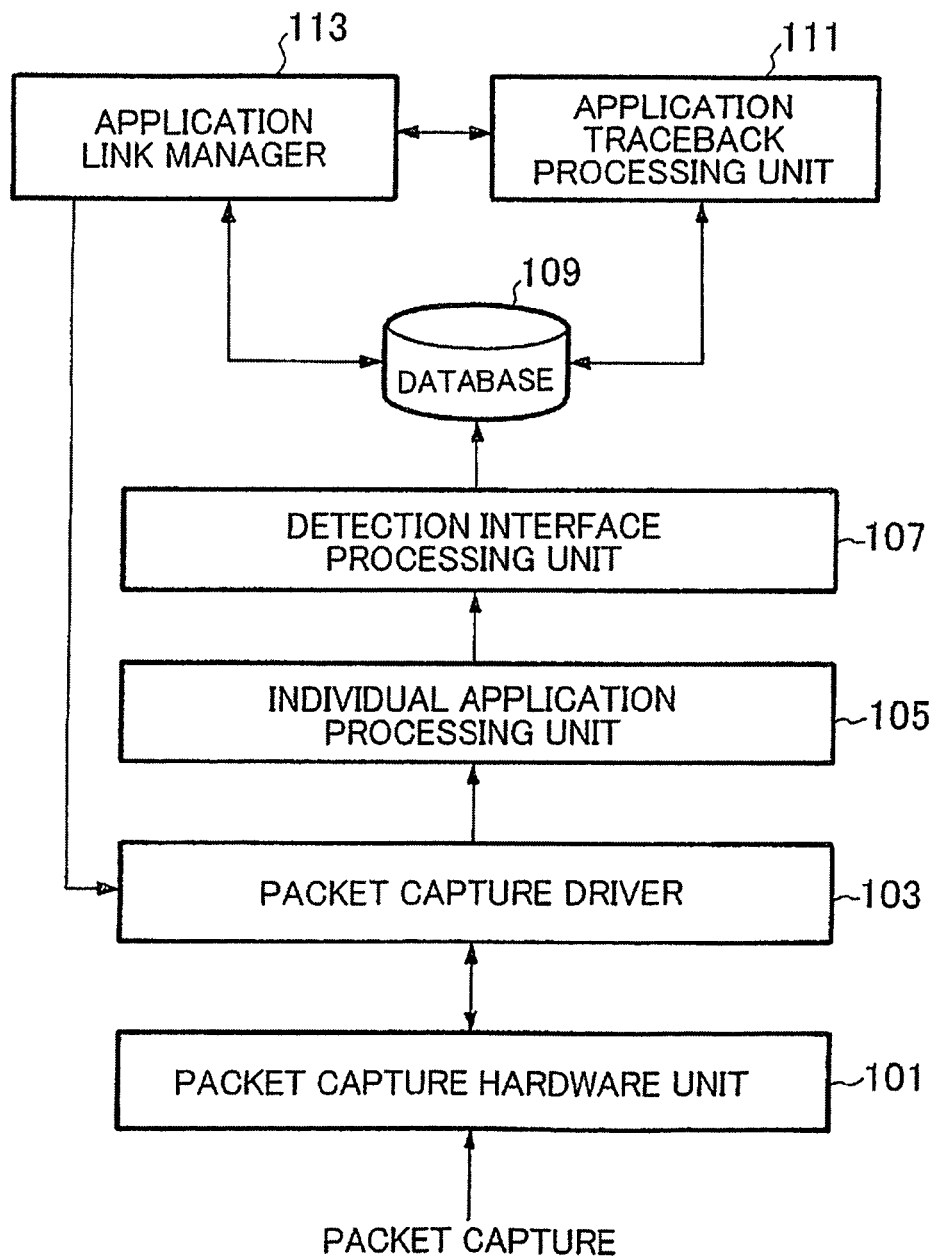
FIG. 1 A diagram showing a basic configuration of an embodiment of the present invention.

101 Packet capture hardware unit
103 Packet capture driver
105 Individual application processing unit
107 Detection interface processing unit
109 Database
111 Application traceback processing unit
113 Application link manager
201 Packet capture hardware unit
203 Packet capture driver
205 Individual application processing unit
207 Detection interface processing unit
209 Database
211 Application traceback processing unit
213 Application link manager
301 Filter information recording unit
302 DNS data filter unit
303 DNS record expansion unit 304 DNS data check unit
305 DNS data process unit

DESCRIPTION OF EMBODIMENTS

Next, embodiments of the present invention will be described with reference to the drawings.

First Embodiment

FIG. 1 shows an example of a configuration according to the invention. According to an embodiment of the present invention, a source detection device for detecting application-linked viruses and DNS attacks is a data collection device from program processings. The source detection device for detecting application-linked viruses and DNS attacks includes a packet capture hardware unit 101, a packet capture driver 103, an individual application processing unit 105, a detection interface processing unit 107, a database 109, an application traceback processing unit 111, and an application link manager 113.

Each of units described above operates as follows. The packet capture driver 103 sets conditions in the packet capture hardware unit 101, to obtain packets using an arbitrary protocol. The packet capture hardware unit 101 captures packets of each protocol from a network such as a LAN (Local Area Network) based on the conditions set by the packet capture driver 103. The packet capture driver 103 obtains packets from the packet capture hardware unit 101, and sends the packets to the individual application processing unit 105, separately for each of individual applications. The individual application processing unit 105 executes operations for absorbing processings specific to application protocols. Operations to be executed are, for example, reconstruction of a packet or a divided file, analysis of protocol data, decoding, presence/absence of a file, expansion of a file, a virus infection check, a statistical processing for attaining a traffic volume per unit time, etc. Further, information required for tracing back applications is collected and summarized. The detection interface processing unit 107 provides a conversion of output data from the individual application processing unit 105 into a format which is recognized by the application traceback processing unit 111, and sends the converted output data to the database 109.

An encryption function may further be included to encrypt user information.

In addition to data from the detection interface processing unit 107, virus information and logs of each application server are stored into the database 109. The application traceback processing unit 111 executes algorithms for carrying out an application traceback for each application. The application traceback processing unit 111 specifies a source which has directly made an attack per single application protocol unit, from the data stored in the database 109. The application traceback processing unit 111 may be built in a main system or independent from the main system.

The application link manager 113 determines presence/absence of linkage to an application from the virus information and logs of respective servers stored in the database 109 and from a result of the application traceback processing unit 111, as well as linkage to a virus from collected packet-captured data. If presence of another relevant application protocol is confirmed as a result of making-determinations, the application traceback processing unit 111 is notified of that source detection should be performed under application conditions of a linkage source.

Further, the application link manager 113 resets conditions in the packet capture driver 103, and collects packets under new conditions, to update linkage information of the data in the database 109. The database 109, the application traceback processing unit 111, and the application link manager 113 repeat determinations under new conditions, and continue processing while changing conditions, until an actual attacker is detected.

Next, with reference to FIG. 2, a detailed description will be made of an example case that a virus propagates and spreads with a SMTP protocol (by emails).

Figure 2:
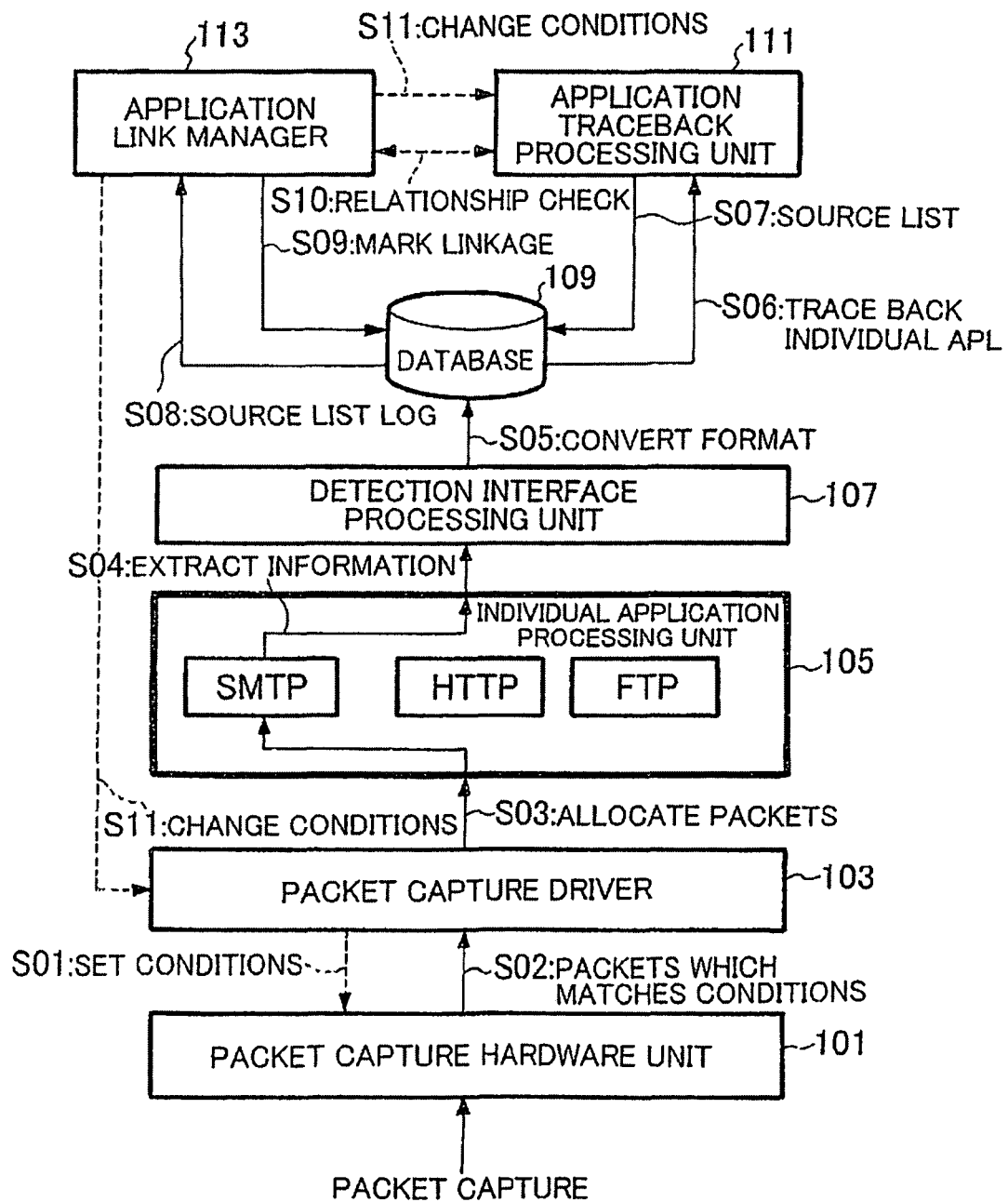
FIG. 2 A diagram showing an example configuration of the present invention.

In FIG. 2, the packet capture driver 103 sets the packet capture hardware unit 101 so as to obtain packets using the SMTP protocol (Simple Mail Transfer Protocol: emails), HTTP protocol (HyperTextTransfer Protocol: webaccess), and FTP protocol (File Transfer Protocol: file transfer) which can highly possibly introduce a virus file from outside into the packet capture hardware unit 101 (S01). According to the setting, the packet capture hardware unit 101 captures packets using the SMTP, HTTP, and FTP protocols on the network (S02).

The packet capture driver 103 obtains packets from the packet capture hardware unit 101, and transfers the packets to the individual application processing unit 105, separately for each of individual applications (S03) In this embodiment, the packet capture driver 103 sends packets for SMTP processings in the individual application processing unit 105, assuming that SMTP protocol is attached with a virus file.

The individual application processing unit 105 performs reconstruction of divided mail packets, detection of presence/absence of an attached file, decoding and expansion of the file, presence/absence of virus infection of the attached file, and measurement of a mail traffic volume per unit time. Further, the individual application processing unit 105 collects and processes header information, such as a source address, a destination address, a message ID, a name of used protocol, mail packet receipt date/time, and a host name, which are required for tracing back applications. The individual application processing unit 105 then sends the header information to the detection interface processing unit 107 (S04).

The detection interface processing unit 107 performs a format conversion in compliance with input to the application traceback processing unit 111, and stores converted virus information and logs of respective servers into the database 109 (S05). As information to be stored, FIG. 3 shows an example of output "syslog" from the detection interface processing unit 107.

The application traceback processing unit 111 detects possibility of spreading of a virus depending on SMTP protocol, from the converted virus information and logs of respective servers which are stored in the database 109. If spreading of a virus is determined to be possible, the application traceback processing unit 111 executes a processing for tracing back an application by SMTP (S06) The unit 111 takes sources obtained by the traceback processing, as candidates for a temporarily-assumed mail source, and lists up the sources (S07). Otherwise, in place of listing up the sources, source candidates may be detected.

Next, the application link manager 113 determines relationships between candidates for a temporarily-assumed source and viruses, from information such as a list of candidates for a temporarily-assumed source, which have been listed by the application traceback processing unit 111, a per-unit-time traffic volume, operations and features of viruses stored in the database 109, and logs of respective servers.

As a determination method, for example, in a case that the per-unit-time traffic volume at a temporarily-assumed source increases at a certain time point, consideration is taken into a relationship with a virus which may behave to cause such an increase. From server logs, for example, consideration is taken into whether or not a symptom which correlates with a feature of a virus has been appearing since a time point when a certain mail was received before. Further, from accumulated features of viruses, for example, whether or not a trace of a virus mixed in a file attached to a mail is found is considered. From these various considerations, presence/absence of a relationship with a virus is determined (S08). If linkage is determined to be possible, a corresponding temporarily-assumed source stored in the database 109 is marked as a source for which linkage to a virus is confirmed. The relationship between the temporarily-assumed source and the virus is accumulated in the database 109. As a result of this, later traceback processings, and data basing a later determination on linkage to applications can be dynamically changed and accumulated.

The application link manager 113 determines a situation and history of infection of a virus and specifies an infection route, based on information such as the accumulated information obtained from applications, log information of respective servers, and/or feature information of viruses (S09).

Consideration will further be taken into a case that a server is attacked by ICMP ECHO (Internet Control Message Protocol). ICMP ECHO is a protocol for transferring IP error messages and control messages. This protocol is used in order that devices connected to a network check the others' states.

If a server is attacked by ICMP ECHO and issues a traceback execution request, a determination processing is carried out between the application traceback processing unit 111 and the application link manager 113, to determine a relationship between ICMP ECHO and SMTP protocol attached with a virus file, from presence/absence information of linkage between an actually attacking computer and viruses accumulated in the database 109, from a candidate list for a temporarily-assumed source, and from server logs. As a determination method, for example, whether or not correspondence or a relationship is found between virus behavior information and features of a corresponding ICMP ECHO attack is considered. Further, for example, a source as a source obtained by analyzing a SMTP protocol is compared with the candidate list for a temporarily-assumed source, to consider whether an identical source is stored or not. As a further example, a consideration is taken into any relationship between a time point when a mail was received, which is obtained from log information of each server, and a time point when a symptom of a virus appeared. From various viewpoints as described above, a determination is made based on feature information of viruses stored in the database 109 (S10).

At this time, if captured data for ICMP ECHO is required to make the determination, the application link manager 113 sends an instruction to the packet capture driver 103 so as to capture packets. Then, header information obtained is collected and analyzed from the ICMP ECHO, so that required data such as a source IP address, transmission date/time, and a MAC address is accumulated into the database 109 (S10).

To specify a source of the ICMP ECHO, the application link manager 113 sends an instruction to the application traceback processing unit 111 so as to trace back the ICMP ECHO, thereby to fix a source. In this case, the application traceback processing unit 111 traces back a source of the ICMP ECHO from information stored in the database 109 (S11).

As described above, a cause of an attack of sending a large volume of ICMP ECHO car be specified to be a virus file attached to an email which was received before. In this manner, linkage between the virus file and the source is detected so that not only a source which directly made the attack of sending a large volume of ICMP ECHO but also an actual attacker which sent the email attached with a virus which causes the attack can be fixed.

Second Embodiment

As another embodiment of the present invention, the second embodiment has the same basic configuration as described above. However, the second embodiment deals with a case that a virus file sent by a web access automatically starts up internal SMTP of a virus and diffuse the virus file by emails. According to the same configuration as described above, an application traceback is carried out to detect a source of emails as a temporarily-assumed attacker.

The application link manager 113 assumes a source of emails to be a temporarily-assumed attacker while the application link manager 113 can know, from information of a packet-captured HTTP protocol, that the temporarily-assumed attacker is infected with a virus by a web access. In this case, an original attacker can be detected, as in the first embodiment, by further tracing back an application based on file information obtained from the HTTP protocol.

Third Embodiment

Next, an operation example will be described in details with reference to FIG. 4.

In FIG. 4, a packet capture driver 203 sets a packet capture hardware unit 201 so as to obtain packets using SMTP protocol (for emails) and DNS protocol (for DNS services) (S101).

According to the setting, the packet capture hardware unit 201 captures packets using the SMTP, and DNS protocols on the network (S102).

The packet capture driver 203 obtains packets from the packet capture hardware unit 201, and transfers the packets to the individual application processing unit 205, separately for each of individual applications (S103). In this embodiment, the packet capture driver 103 sends packets for DNS processings in the individual application processing unit 205, assuming that an attack to a DNS server is taking place.

Figure 5:
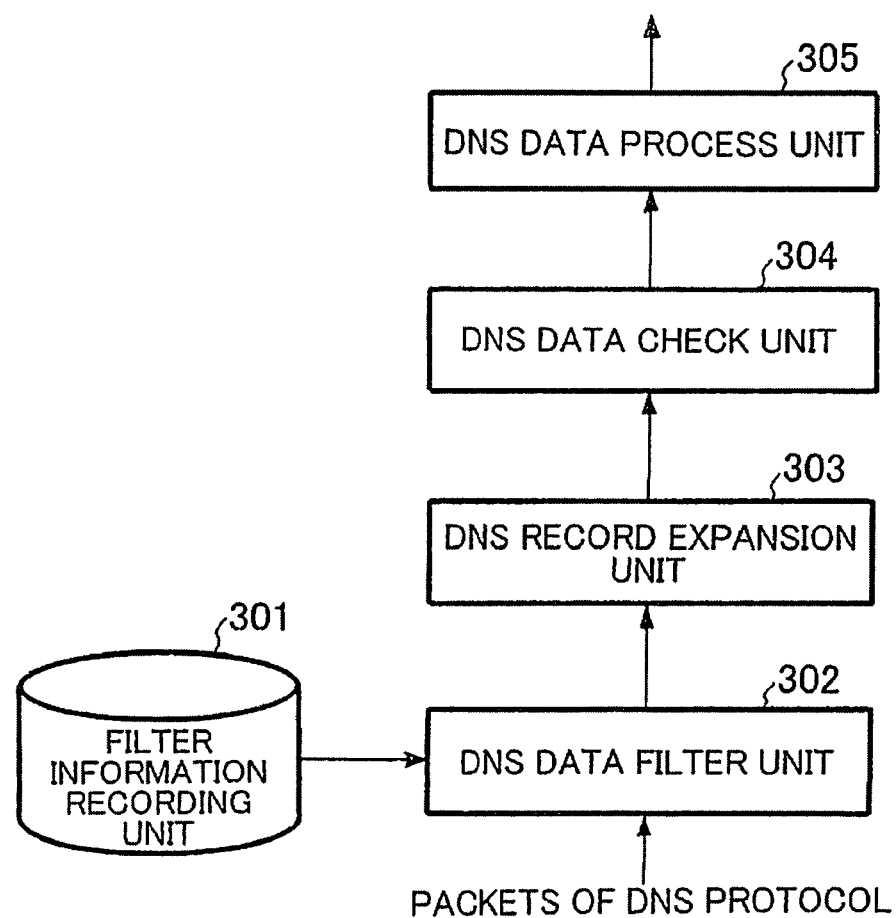
FIG. 5 A diagram showing an example configuration of individual application processing (DNS portion) according to the embodiment of the present invention.

FIG. 5 shows a configuration of DNS attack detection performed by the individual application processing unit 205. For DNS attack detection, the individual application processing unit 205 is configured to include a filter information recording unit 301, a DNS data filter unit 302, a DNS record expansion unit 303, a DNS data check unit 304, and a DNS data process unit 305.

The filter information recording unit 301 records filter information. The DNS data filter unit 302 filters information which is not required for application trackback, based on the filter information recorded in the filter information recording unit 301. The DNS record expansion unit 303 expands compressed DNS data. The DNS data check unit 304 checks DNS data. The DNS data process unit 305 collects and/or processes header information such as a source address, a destination address, a used protocol name, and/or DNS packet receipt date/time, which are required for tracing back applications.

The packets sent to the individual application processing unit 205 are processed through the DNS data filter unit 302 to the DNS data process unit 305, and are then sent as "converted DNS attack information" to the detection interface processing unit 207 (S104).

The detection interface processing unit 207 performs a format conversion in compliance with input to the application traceback processing unit 211, and stores converted DNS attack information and logs of respective servers into the database 209 (S105). As information to be stored, FIG. 6 shows an example of output "syslog" from the detection interface processing unit 207.

The application traceback processing unit 211 detects possibility of a DNS attack depending on DNS protocol, from the converted DNS attack information and logs of respective servers which are stored in the database 209. If a DNS attack is determined to be possible, the application traceback processing unit 211 executes a processing for tracing back applications by DNS (S106). The unit 211 takes sources obtained by the traceback processing, as candidates for a temporarily-assumed source of the DNS attack, and lists up the sources (S107). Otherwise, in place of listing up the sources, source candidates may be detected.

Next, the application link manager 213 determines relationships between the candidates for a temporarily-assumed source and the DNS attack, from information such as a list of the candidates for a temporarily-assumed source, which have been listed by the application traceback processing unit 211, a per-unit-time traffic volume, features and operations of DNS attacks stored in the database 209, and logs of respective servers.

As a determination method, for example, in a case that the per-unit-time traffic volume at a temporarily-assumed source increases at a certain time point, consideration is taken into a relationship with a DNS attack which behaves to cause such an increase. From server logs, for example, consideration is taken into whether or not a symptom which correlates with a feature of a DNS attack has been appearing since a time point when a certain DNS query was received before. Further, from accumulated features of DNS attacks, for example, whether or not any trace is found is considered. From these various considerations, presence/absence of linkage to an application is determined (S108). If linkage is determined to be possible, a corresponding temporarily-assumed source stored in the database 209 is marked as a source for which linkage to a DNS attack is confirmed. The relationship confirmed between the temporarily-assumed source and the DNS attack is accumulated into the database 209. As a result of this, later traceback processings, and data basing a later determination on linkage to applications can be dynamically changed and accumulated.

The application link manager 213 determines a source as an actual attacker of the DNS attack, and specifies an attack route of the DNS attack, based on information such as the accumulated information obtained from applications, log information of respective servers, and/or feature information of DNS attacks (S109).

A first effect of the embodiment of the present invention as described above is to make linkage to applications recognizable by collecting required information and by attaining effective information and accumulating data concerning relationships while dynamically changing conditions.

A second effect is to enable rapid response to a new virus which will cause relationships to change between an attack of the virus and an application enhancing infection.

A third effect is to enable detection of not only a directly attacking computer as a springboard but also an original attacker which has originally set the springboard.

A fourth effect is to enable rapid response to an attack using a DNS server.

The source detection device for viruses and DNS attacks linked to applications can be constituted by hardware, software, or a combination thereof.

Typical embodiments of the present invention have been described in details above and should be understood that various changes, substitutions, and alternatives are available without deviating from the spirit and scope of the claimed invention. If any of claims should be amended in the procedure of application, the inventor intends that an equivalent scope to that of the claimed invention should be maintained.

INDUSTRIAL APPLICABILITY

The present invention is applicable widely to prevent attacks on the Internet by detecting sources of attackers depending on various applications through networks.

The invention claimed is:

1. A source detection method for detecting a source of virus and/or a DNS attack, comprising:
   a step of storing virus information to a database;
   a step of capturing packets of a designated protocol, said packets being sent from a network;
   a step of gathering the captured packets on per application basis, performing processing related to an application which is associated with the received packets, said processing including at least detection of presence or absence of virus and/or DNS attack, in order to obtain information necessary for traceback related to the application;
   a step of converting format of the obtained information to format common among applications and storing the obtained information in the common format to a database;
   a step of performing the traceback related to the application, in order to locate a source which has attacked a target;
   a step of storing log information with respect to each application server which has run;
   a step of detecting presence or absence of linkage of applications, based on the virus information, the log information of each application server, a result of the traceback related to each application, and the information obtained from the captured packets, which are stored in the database; and
   a step of, if presence of linkage between a first application, with respect to which the traceback is performed, and a second application is detected, repeating a group of the step of capturing packets of another designated protocol which corresponds to the second application, the step of gathering, the step of converting, and the step of performing the traceback related to the second application.

2. The source detection method according to claim 1, wherein:
   the step of performing the traceback outputs at least a candidate of source of attack related to the application presently treated;
   the step of detecting presence or absence of linkage includes determination regarding relation between the candidate of source of attack and virus based on the candidate of the source of attack, volume amount per unit time, operation and feature of virus, and a log of each application server; and the step of detecting presence or absence of linkage further includes making a mark in the database for the candidate of source of attack which is determined to have relation with virus.

3. The source detection method according to claim 2, wherein an actual source of attack is detected from among at least the candidate of attack.

4. The source detection method according to claim 1, wherein second application had been executed before execution of the first application.

5. The source detection method according to claim 1, wherein the step of repeating is iterated until an original source of attack is located.

6. The source detection method according to claim 1, wherein said processing includes, in addition of detection of presence or absence of virus, at least one of reconstruction of divided mail packet, detection of presence or absence of a file attached to a mail, decoding of the file, if any, expansion of the file, if any, and measurement of mail traffic volume per unit time.

7. The source detection method according to claim 1, wherein the information necessary for traceback includes at least one of a source address of packets, a destination address of packets, a message ID, a name of used protocol, date and time of reception of packets, a host name.

8. The source detection method according to claim 1, wherein:
the first application uses a protocol which is different from a protocol that the second application uses, and
the virus and/or the DNS attack are constructed by linking the first application and the second application.

9. A non-transitory computer-readable medium, on which a program is recorded, said program, when executed, causing a computer to perform a source detection method for detecting a source of virus and/or a DNS attack, said method comprising:
a step of storing virus information to a database;
a step of capturing packets of a designated protocol, said packets being sent from a network;
a step of gathering the captured packets on per application basis, performing processing related to an application which is associated with the received packets, said processing including at least detection of presence or absence of virus and/or DNS attack, in order to obtain information necessary for traceback related to the application;
a step of converting format of the obtained information to format common among applications and storing the obtained information in the common format to a database;
a step of performing the traceback related to the application, in order to locate a source which has attacked a target;
a step of storing log information with respect to each application server which has run;
a step of detecting presence or absence of linkage of applications, based on the virus information, the log information of each application server, a result of the traceback related to each application, and the information obtained from the captured packets, which are stored in the database; and
a step of, if presence of linkage between a first application, with respect to which the traceback is performed, and a second application is detected, repeating a group of the step of capturing packets of another designated protocol which corresponds to the second application, the step of gathering, the step of converting, and the step of performing the traceback related to the second application.

10. The non-transitory computer-readable medium according to claim 9, wherein:
the step of performing the traceback outputs at least a candidate of source of attack related to the application presently treated;
the step of detecting presence or absence of linkage includes determination regarding relation between the candidate of source of attack and virus based on the candidate of the source of attack, volume amount per unit time, operation and feature of virus, and a log of each application server; and
the step of detecting presence or absence of linkage further includes making a mark in the database for the candidate of source of attack which is determined to have relation with virus.

11. The non-transitory computer-readable medium according to claim 10, wherein an actual source of attack is detected from among at least the candidate of attack.

12. The non-transitory computer-readable medium according to claim 9, wherein second application had been executed before execution of the first application.

13. The non-transitory computer-readable medium according to claim 9, wherein the step of repeating is iterated until an original source of attack is located.

14. The non-transitory computer-readable medium according to claim 9, wherein said processing includes, in addition of detection of presence or absence of virus, at least one of reconstruction of divided mail packet, detection of presence or absence of a file attached to a mail, decoding of the file, if any, expansion of the file, if any, and measurement of mail traffic volume per unit time.

15. The non-transitory computer-readable medium according to claim 9, wherein the information necessary for traceback includes at least one of a source address of packets, a destination address of packets, a message ID, a name of used protocol, date and time of reception of packets, a host name.

16. A source detection device for detecting a source of virus and/or a DNS attack, comprising:
a database that stores at least virus information and logs of each application server;
a hardware-implemented packet capture driver unit that sets conditions designating protocol for capturing packets;
a hardware-implemented packet capture unit that captures packets based on the conditions, said packets being sent from a network;
hardware-implemented individual application processing unit that gathers the captured packets on per application basis, perform processing related to an application which is associated with the received packets, said processing including at least detection of presence or absence of virus and/or DNS attack, in order to obtain information necessary for traceback related to the application;
a hardware-implemented detection interface processing unit that converts format of the obtained information to format common among applications and storing the obtained information in the common format to the database;
hardware-implemented application traceback processing unit that executes the traceback related to the application, in order to locate a source which has attacked a target, based on the data stored in the database; and
hardware-implemented application link manager unit that determines presence or absence of linkage of applications, based on the virus information, the log information of each application server, a result of the traceback related to each application, and the information obtained from the captured packets, which are stored in the database, wherein if presence of linkage between a first application, with respect to which the traceback is performed, and a second application is detected, then the application link manager unit changes conditions in the packet capture driver unit so that packets corresponding to the second application can be captured, the packet capture hardware unit captures packets corresponding to the second application, the individual application processing unit gathers the captured packets corresponding to the second application, the individual application processing unit obtains information necessary for traceback related to the second application, the detection interface processing unit converts format of the information necessary for traceback related to the second application to the common format before storing the information to the database, and the application traceback processing unit executes the traceback related to the second application.

17. The source detection device according to claim 16, wherein:

the application traceback processing unit outputs at least a candidate of source of attack related to the application presently treated;

the determination by the application link manager includes determination regarding relation between the candidate of source of attack and virus based on the candidate of the source of attack, volume amount per unit time, operation and feature of virus, and a log of each application server; and the detection of presence or absence of linkage includes making a mark in the database for the candidate of source of attack which is determined to have relation with virus.

18. The source detection device according to claim 17, wherein an actual source of attack is detected from among at least the candidate of attack.

19. The source detection device according to claim 16, wherein second application had been executed before execution of the first application.

20. The source detection device according to claim 16, wherein the device iterate operation until an original source of attack is located.

21. The source detection device according to claim 16, wherein said processing includes, in addition of detection of presence or absence of virus, at least one of reconstruction of divided mail packet, detection of presence or absence of a file attached to a mail, decoding of the file, if any, expansion of the file, if any, and measurement of mail traffic volume per unit time.

22. The source detection device according to claim 16, wherein the information necessary for traceback includes at least one of a source address of packets, a destination address of packets, a message ID, a name of used protocol, date and time of reception of packets, a host name.

\* \* \* \* \*